United States Patent
Modha

(10) Patent No.: US 9,495,634 B2
(45) Date of Patent: *Nov. 15, 2016

(54) SCALABLE NEUROMORPHIC SYNAPTRONIC SYSTEM WITH OVERLAID CORES FOR SHARED NEURONAL ACTIVATION AND OPPOSITE DIRECTION FIRING EVENT PROPAGATION

(75) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

This patent is subject to a terminal disclaimer.

(21) Appl. No.: 13/596,267

(22) Filed: Aug. 28, 2012

(65) Prior Publication Data

US 2015/0262058 A1  Sep. 17, 2015

Related U.S. Application Data

(63) Continuation of application No. 13/360,614, filed on Jan. 27, 2012, now Pat. No. 8,996,430.

(51) Int. Cl.
*G06N 3/063* (2006.01)
*G06N 3/06* (2006.01)
*G06N 3/04* (2006.01)
(Continued)

(52) U.S. Cl.
CPC ......... *G06N 3/063* (2013.01); *G06F 17/30979* (2013.01); *G06N 3/04* (2013.01); *G06N 3/049* (2013.01); *G06N 3/06* (2013.01); *G06N 3/061* (2013.01); *G06N 3/02* (2013.01)

(58) Field of Classification Search
None
See application file for complete search history.

(56) References Cited

U.S. PATENT DOCUMENTS 7,139,687 B2  11/2006  Eryilmaz et al.
7,174,325 B1   2/2007  Ascoli
(Continued)

FOREIGN PATENT DOCUMENTS

WO  2009113993 A1  9/2009
WO  2010025130 A1  3/2010

OTHER PUBLICATIONS

Galluppi et al. A General-Purpose Model Translation System for a Universal Neural Chip. ICONIP 2010, Part I, LNCS 6443, pp. 58-65, 2010.*

(Continued)

*Primary Examiner* — Stanley K Hill
*Assistant Examiner* — Robert H Bejcek, II
(74) *Attorney, Agent, or Firm* — Sherman IP LLP; Kenneth L. Sherman; Hemavathy Perumal

(57) ABSTRACT

In one embodiment, the present invention provides a method comprising propagating a first set and a second set of axonal firing events through a symmetric core circuit in a first direction and a second direction, respectively. The symmetric core circuit comprises a first core module and a second core module, and each core module comprises an interconnection network for interconnecting multiple electronic neurons with multiple electronic axons. The method further comprises, for at least one neuron, receiving an axonal firing event via an interconnected axon, and, for at least one neuron, generating a neuronal firing event according to a neuronal activation function. Each core module of the symmetric core circuit has a corresponding adaptive lookup table, the corresponding adaptive lookup table used to determine target axons for neuronal firing events generated by neurons in the core module.

20 Claims, 16 Drawing Sheets

(51) Int. Cl.
*G06F 17/30* (2006.01)
*G06N 3/02* (2006.01)

(56) References Cited

U.S. PATENT DOCUMENTS

| | | | |
|---|---|---|---|
| 7,533,071 | B2 | 5/2009 | Snook et al. |
| 7,818,273 | B2 | 10/2010 | Ananthanarayanan et al. |
| 8,250,010 | B2 | 8/2012 | Modha et al. |
| 8,250,011 | B2 | 8/2012 | Van Der Made |
| 8,655,801 | B2 | 2/2014 | Raichelgauz et al. |
| 8,812,414 | B2 | 8/2014 | Arthur et al. |
| 2009/0292661 | A1 | 11/2009 | Haas |
| 2010/0241601 | A1 | 9/2010 | Carson et al. |
| 2010/0299297 | A1 | 11/2010 | Breitwisch et al. |
| 2012/0084240 | A1 | 4/2012 | Esser et al. |
| 2013/0073497 | A1 | 3/2013 | Akopyan et al. |

OTHER PUBLICATIONS

Boahen, K., "Neuromorphic Microchips", May 2005, Scientific American, pp. 56-63, United States.
Seo, J. et al., "A 45nm CMOS Neuromorphic Chip with a Scalable Architecture for Learning in Networks of Spiking Neurons", Proceedings of the 2011 IEEE Custom Integrated Circuits Conference (CICC), Sep. 19-21, 2011, pp. 1-4, IEEE, United States.
Merolla, P.A. et al., "Expandable Networks for Neuromorphic Chips," IEEE Transactions on Circuits and Systems—I: Regular Papers, Feb. 2007, pp. 301-311, vol. 54, No. 2, IEEE, United States.
Lin, J. et al., "Programmable Connections in Neuromorphic Grids", Proceedings of the 49th International Midwest Symposium on Circuits and Systems, Aug. 6-9, 2006, pp. 80-84, IEEE, United States.
Merolla, P. et al., "A Digital Neurosynaptic Core Using Embedded Crossbar Memory with 45pJ per Spike in 45nm", In the Proceedings of the 2011 Custom Integrated Circuits Conference (CICC), Sep. 19-21, 2011, pp. 1-4, IEEE Xplore, United States.
U.S. Non-Final Office Action for U.S. Appl. No. 13/360,614 mailed Jun. 11, 2014.
U.S. Notice of Allowance for U.S. Appl. No. 13/360,614 mailed Nov. 21, 2014.
U.S. Corrected Notice of Allowability for U.S. Appl. No. 13/360,614 mailed Jan. 13, 2015.

\* cited by examiner

SCALABLE NEUROMORPHIC SYNAPTRONIC SYSTEM WITH OVERLAID CORES FOR SHARED NEURONAL ACTIVATION AND OPPOSITE DIRECTION FIRING EVENT PROPAGATION

CROSS-REFERENCE TO RELATED APPLICATIONS

This patent application is a continuation of U.S. Non-Provisional patent application Ser. No. 13/360,614 filed Jan. 27, 2012, the disclosure of which is incorporated herein by reference.

GOVERNMENT RIGHTS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, hierarchical organization and structural plasticity for neural network circuits.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

In one embodiment, the present invention provides a neural network circuit comprising multiple symmetric core circuits. Each symmetric core circuit comprises a first core module and a second core module. Each core module comprises a plurality of electronic neurons, a plurality of electronic axons, and an interconnection network comprising multiple electronic synapses interconnecting the axons to the neurons. Each synapse interconnects an axon to a neuron. The first core module and the second core module are logically overlaid on one another such that neurons in the first core module are proximal to axons in the second core module, and axons in the first core module are proximal to neurons in the second core module. Each neuron in each core module receives axonal firing events via interconnected axons and generates a neuronal firing event according to a neuronal activation function.

In another embodiment, the present invention provides a neural network circuit comprising multiple core modules. Each core module comprises a plurality of electronic neurons, a plurality of electronic axons, and an electronic synapse array comprising multiple electronic synapses interconnecting the axons to the neurons. Each synapse interconnects an axon to a neuron. Each neuron in each core module receives axonal firing events via interconnected axons and generates a neuronal firing event according to a neuronal activation function.

These and other features, aspects and advantages of the present invention will become understood with reference to the following description, appended claims and accompanying figures.

DETAILED DESCRIPTION

Figure 1:
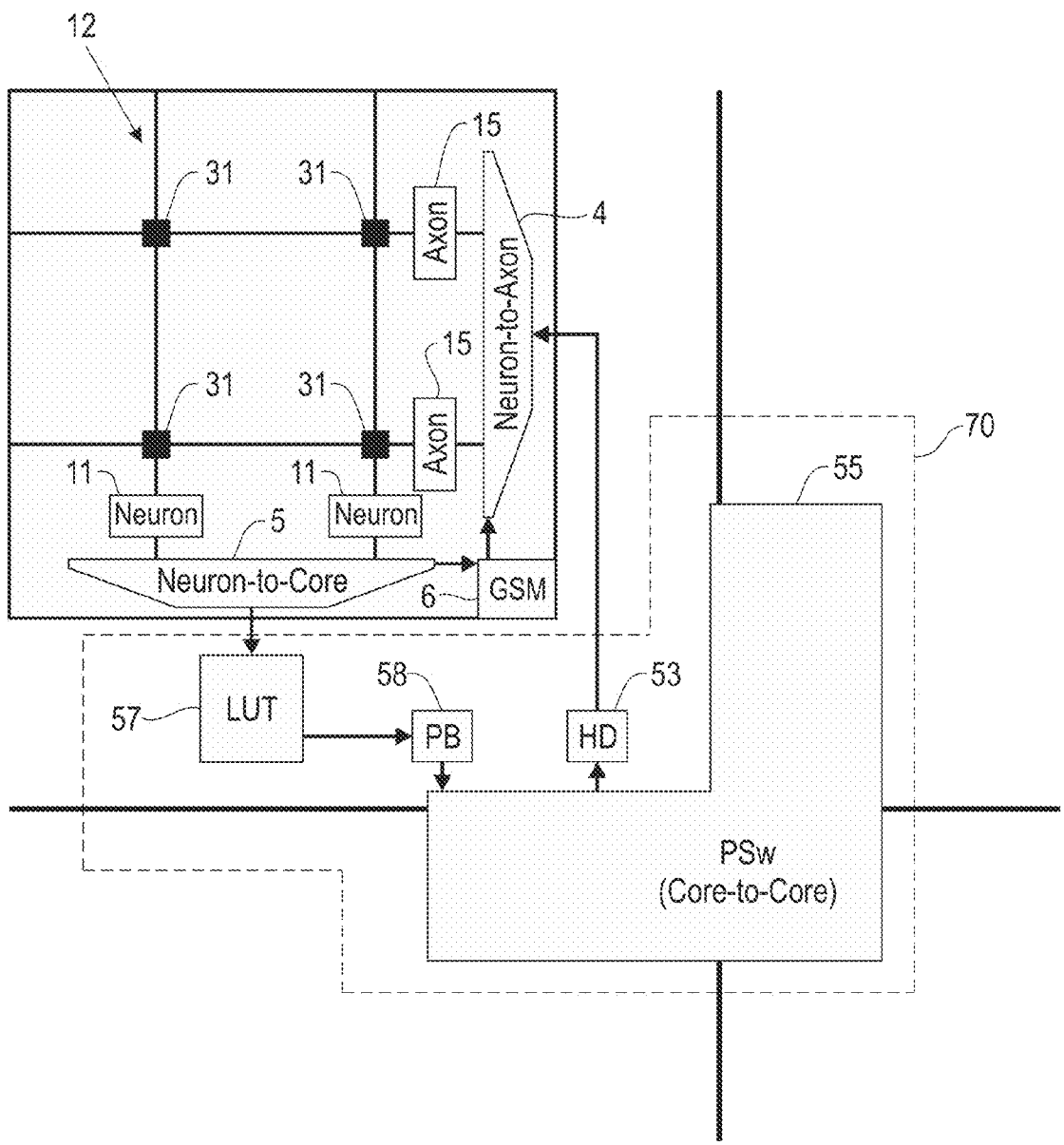
FIG. 1 illustrates an example core module, in accordance with an embodiment of the invention.

The present invention relates to neuromorphic and synaptronic computation, and in particular, hierarchical organization and structural plasticity for neural network circuits. Embodiments of the present invention provide a scalable neuromorphic and synaptronic architecture. In one embodiment, the present invention provides a neural network circuit comprising multiple symmetric core circuits. Each symmetric core circuit comprises a first core module and a second core module. Each core module comprises a plurality of electronic neurons, a plurality of electronic axons, and an interconnection network comprising multiple electronic synapses interconnecting the axons to the neurons. Each synapse interconnects an axon to a neuron. The first core module and the second core module are logically overlaid on one another such that neurons in the first core module are proximal to axons in the second core module, and axons in the first core module are proximal to neurons in the second core module. Each neuron in each core module receives axonal firing events via interconnected axons and generates a neuronal firing event according to a neuronal activation function.

In each symmetric core circuit, a first set of axonal firing events propagates through synapses in the symmetric core circuit in a first direction, and a second set of axonal firing events propagates through synapses in the symmetric core circuit in a second direction. The synapses have synaptic weights. The synaptic weights are learned as a function of: the first set of axonal firing events propagating through the synapses in the symmetric core circuit in the first direction, a first set of neuronal activations, the second set of axonal firing events propagating through the synapses in the symmetric core circuit in the second direction, and a second set of neuronal activations.

The neural network circuit further comprises an event routing system that selectively routes the neuronal firing events among the symmetric core circuits. The event routing system comprises, for each symmetric core circuit, a first lookup table and a second lookup table corresponding to the first core module and the second core module, respectively. Each lookup table is configured to determine target axons for neuronal firing events generated by neurons in a core module corresponding to the lookup table. The event routing system is symmetric, such that for a first neuron targeting a first axon, a second neuron proximal to the first axon targets a second axon proximal to the first neuron. Each lookup table is adaptive as a function of learning rules. Each lookup table comprises a sparse cross-bar.

The event routing system further comprises, for each symmetric core circuit, a core-to-core packet switch configured to direct the neuronal firing events to the target axons. The event routing system selectively routes the neuronal firing events among the symmetric core circuits based on a hierarchical organization of the symmetric core circuits.

The hierarchical organization of the symmetric core circuits comprises multiple chip structures, each chip structure comprising a plurality of symmetric core circuits. The event routing system further comprises, for each chip structure, a chip-to-chip lookup table configured to determine target chip structures containing target axons for neuronal firing events generated by neurons in the chip structure, and a chip-to-chip packet switch configured to direct the neuronal firing events to the target chip structures containing the target axons.

The hierarchical organization of the symmetric core circuits further comprises multiple board structures, each board structure comprising a plurality of chip structures. The event routing system further comprises, for each board structure, a board-to-board lookup table configured to determine target board structures containing target axons for neuronal firing events generated by neurons in said board structure, and a board-to-board packet switch configured to direct the neuronal firing events to the target board structures containing the target axons.

The interconnection network comprises an electronic synapse array. In one example implementation, the interconnection network comprises a first electronic synapse array and a second electronic synapse array, wherein the first electronic synapse array corresponds to the first core module, and the second electronic synapse array corresponds to the second core module. The first electronic synapse array and the second electronic synapse array may be physically the same.

In another embodiment, the present invention provides a neural network circuit comprising multiple core modules. Each core module comprises a plurality of electronic neurons, a plurality of electronic axons, and an electronic synapse array comprising multiple electronic synapses interconnecting the axons to the neurons. Each synapse interconnects an axon to a neuron. Each neuron in each core module receives axonal firing events via interconnected axons and generates a neuronal firing event according to a neuronal activation function.

The synaptic weights are learned as a function of axonal firing events propagating through the synapses in said core module, and neuronal activations. The neural network circuit further comprises an event routing system that selectively routes the neuronal firing events among the core modules. The event routing system selectively routes the neuronal firing events among the core modules based on a hierarchical organization of the core modules. The hierarchical organization of the core modules comprises multiple chip structures, each chip structure comprising a plurality of core modules. The hierarchical organization of the core modules further comprises multiple board structures, each board structure comprising a plurality of chip structures.

Embodiments of the invention provide an adaptive neural network circuit that can interface in real-time with spatiotemporal sensorium and motorium to carry out tasks of perception in a noise-robust, self-tuning, and self-configuring fashion. Embodiments of the invention further provide a neural network circuit that provides locality and massive parallelism to enable a low-power, compact hardware implementation.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

FIG. 1 illustrates an example core module 10, in accordance with an embodiment of the invention. The core module 10 comprises a plurality of electronic neurons 11 and a plurality of electronic axons 15. The core module 10 further comprises an electronic synapse array 12 comprising multiple electronic synapse devices ("synapses") 31 interconnecting the axons 15 to the neurons 11. Each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each neuron 11 receives firing events via interconnected axons and, in response to the firing events received, generates a firing event according to a neuronal activation function. A preferred embodiment for the neuronal activation function can be leaky integrate-and-fire.

In one embodiment, the number of neurons and axons can be equal. Let N denote the number of axons 15, as well as the number of neurons 11, in the core module 10, wherein N is an integer greater than or equal to one. The synapse array 12 may be an N×N ultra-dense crossbar array that has a pitch in the range of about 0.1 nm to 10 µm, wherein "x" represents multiplication. The synapse array 12 accommodates the appropriate ratio of synapses to neurons, and need not be square. In another embodiment, the number of axons can exceed the number of neurons, or there can be more neurons than axons.

In one embodiment of the invention, when neurons 11 generate a firing event, they maintain a postsynaptic-STDP (post-STDP) variable that decays. For example, in one embodiment, the decay period may be 50 ms. The post-STDP variable is used to achieve STDP by encoding the time since the last firing of an associated neuron 11. Such STDP is used to control long-term potentiation or "potentiation", which in this context is defined as increasing synaptic conductance. When axons 15 generate a firing event, they maintain a presynaptic-STDP (pre-STDP) variable that decays in a similar fashion as that of neurons 11.

Pre-STDP and post-STDP variables may decay according to exponential, linear, polynomial, or quadratic functions, for example. In another embodiment of the invention, variables may increase instead of decrease over time. In any event, a variable may be used to achieve STDP by encoding the time since the last firing of an associated neuron 11. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using transposable 1-bit static random-access memory (SRAM) cells, wherein each neuron 11 and axon 15 can be an excitatory or inhibitory neuron (or both). Each learning rule on each axon 15 and neuron 11 are reconfigurable. This assumes a transposable access to the synapse array 12. Neurons 11 that generate a firing event are selected one at a time, sending firing events to corresponding axons 15, wherein the corresponding axons 15 could reside in the same core module 10 or somewhere else in a larger system with many core modules 10.

As shown in FIG. 1, the core module 10 further comprises an address-event receiver (Neuron-to-Axon) 4, an address-event transmitter (Neuron-to-Core) 5, and a controller 6 that functions as a global state machine (GSM). The address-event receiver 4 receives firing events and transmits them to target axons. The address-event transmitter 5 transmits firing events generated by the neurons 11 in the core module 10.

The core module 10 receives and transmits one firing event at a time. For example, the core module 10 receives and transmits firing events as one-hot codes: one axon at a time, one neuron at a time. The address-event receiver 4 decodes address events into a one-hot code, in which one axon 15 at a time is driven. The address-event transmitter 5 encodes the firing of neurons 11 (one at a time), in the form of a one-hot code, into an address event. From zero to all axons 15 can be stimulated in a timestep, but each one axon 15 only receives one event in one timestep. Further, from zero to all neurons 11 can fire in one timestep, but each neuron 11 fires once in a timestep. As such, each axon 15 receives events from a single neuron 11, otherwise, two neurons 11 may fire in the same timestep. Further, a neuron 11 may drive several different axons 15.

The controller 6 sequences event activity within a timestep. The controller 6 divides each time-step into operational phases in the core module 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core module 10 further comprises a router 70. The router 70 is configured to selectively route neuronal firing events among core modules 10. The router 70 comprises a firing events address lookup table (LUT) module 57, a packet builder (PB) module 58, a head delete (HD) module 53, and a core-to-core packet switch (PSw) 55. The LUT 57 is configured to determine target axons for firing events generated by the neurons 11 in the core module 10. The target axons may be axons 15 in the same core module 10 or other core modules 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons.

The PB 58 packetizes the routing information retrieved by the LUT 57 into outgoing address-event router packets. The core-to-core PSw 55 directs the outgoing address-event router packets to the core modules 10 containing the target axons. The core-to-core PSw 55 is also configured to receive incoming address-event router packets from other core modules 10. The HD 53 removes routing information from an incoming address-event router packet to deliver it as a time stamped firing event to the address-event receiver 4.

The router 70 selectively routes neuronal firing events among core modules 10 based on a reconfigurable hierarchical organization of the core modules 10. The router 70 provides two-way information flow and structural plasticity. The routing of information between the core modules 10 is adaptive. In one example, each core module 10 includes a plurality of incoming connections such that each incoming connection has a predetermined address, and each core module 10 includes a plurality of outgoing connections such that each outgoing connection targets an incoming connection in a core module 10 among the multiple core modules 10. In one example, the router 70 is within a core module 10. In another example, the router 70 may be external to the core module 10.

Figure 2:
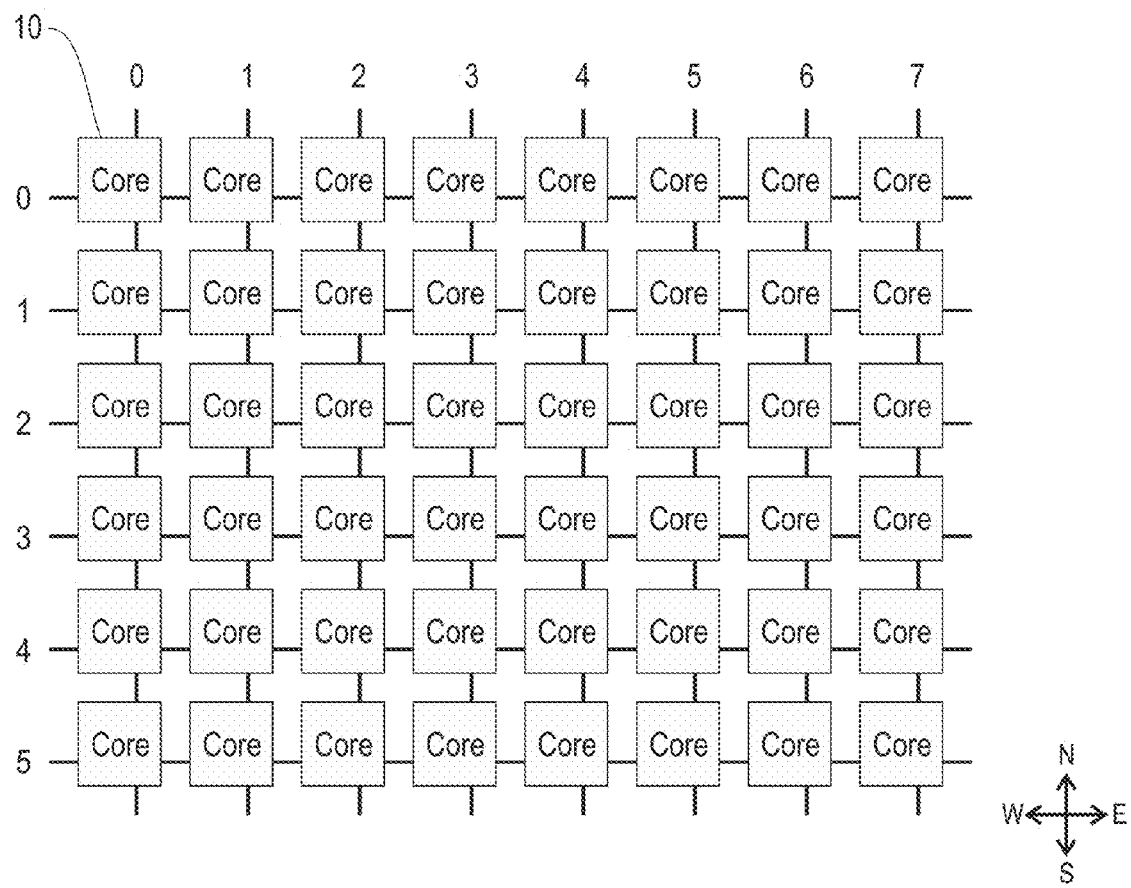
FIG. 2 illustrates an example neural network circuit including multiple interconnected core modules in a scalable low power network, in accordance with an embodiment of the invention.

FIG. 2 illustrates an example neural network circuit 60 including multiple interconnected core modules 10 in a scalable low power network, in accordance with an embodiment of the invention. The core modules 10 are arranged in a 6×8 array. Each core module 10 may be identified by its Cartesian coordinates as core (i, j), where i is a column index and j is a row index in the array (i.e., core (0,0), core (0,1), . . . , (core 5,7)).

Each core module 10 utilizes its core-to-core PSw 55 (FIG. 1) to pass along neuronal firing events in the eastbound, westbound, northbound, or southbound direction. For example, a neuron 11 (FIG. 1) in the core module (0,0) may generate a firing event for routing to a target axon 15 (FIG. 1) in the core module (5,7). To reach the core module (5,7), the firing event may traverse seven core modules 10 in the eastbound direction (i.e., from core (0,0) to cores (0,1), (0,2), (0,3), (0,4), (0,5), (0,6), and (0,7)), and five core modules 10 in the southbound direction (i.e., from core (0,7) to cores (1, 7), (2, 7), (3, 7), (4, 7), and (5, 7)) via the core-to-core PSws 55 in the neural network 60.

In one embodiment, the hierarchical organization of the core modules 10 comprises multiple chip structures 100 (FIG. 3), each chip structure 100 comprising a plurality of core modules 10.

Figure 3:
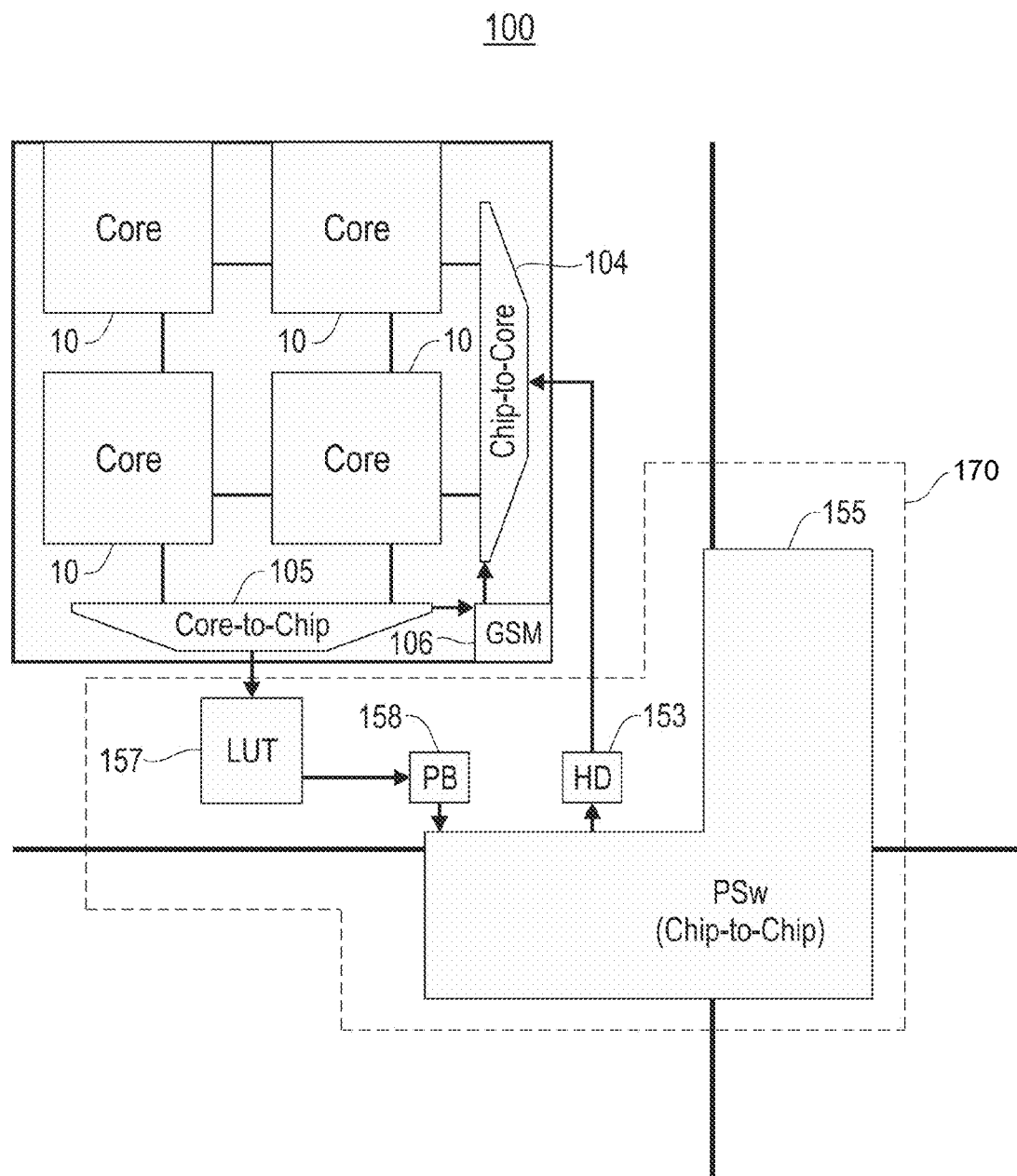
FIG. 3 illustrates a block diagram of a chip structure, in accordance with an embodiment of the invention.

FIG. 3 illustrates a block diagram of a chip structure 100, in accordance with an embodiment of the invention. In one example implementation, the chip structure 100 comprises four core modules 10 as shown in FIG. 3. The chip structure 100 further comprises a chip-to-core address-event receiver (Chip-to-Core) 104, a core-to-chip address-event transmitter (Core-to-Chip) 105, and a controller 106 that functions as a global state machine (GSM). The chip-to-core address-event receiver 104 receives incoming address-event router packets and transmits them to the core modules 10 containing target axons 15 (FIG. 1). The core-to-chip address-event transmitter 105 transmits outgoing address-event router packets generated by the core modules 10. The controller 106 sequences event activity within a time-step, dividing each time-step into operational phases in the chip structure 100 for core module 10 updates, etc.

According to an embodiment of the invention, all core modules within a chip structure 100 share a single router 170 comprising a chip-to-chip lookup table (LUT) module 157, a chip-to-chip packet builder (PB) module 158, a chip-to-chip head delete (HD) module 153, and a chip-to-chip packet switch (PSw) 155. The chip-to-chip LUT 157, chip-to-chip PB 158, chip-to-chip HD 153, and chip-to-chip PSw 155 provide a hierarchical address-event multi-chip mesh router system, as a deadlock-free dimension-order routing (DR).

The chip-to-chip LUT 157 is configured to determine chip structures 100 containing the target axons for outgoing address-event router packets generated by the core modules 10. The chip-to-chip PB 158 packetizes the routing information retrieved by the chip-to-chip LUT 157 into the outgoing address-event router packets. The chip-to-chip PSw 155 directs the outgoing address-event router packets to the determined chip structures 100. The chip-to-chip PSw 155 is also configured to receive incoming address-event router packets from other chip structures 100. The chip-to-chip HD 153 removes some routing information (e.g. chip structure routing information) from an incoming address-event router packet and delivers the remaining incoming address-event router packet to the chip-to-core address-event receiver 104.

In one embodiment, the hierarchical organization of the core modules 10 comprises multiple board structures 200 (FIG. 4), each board structure 200 comprising a plurality of chip structures 100.

Figure 4:
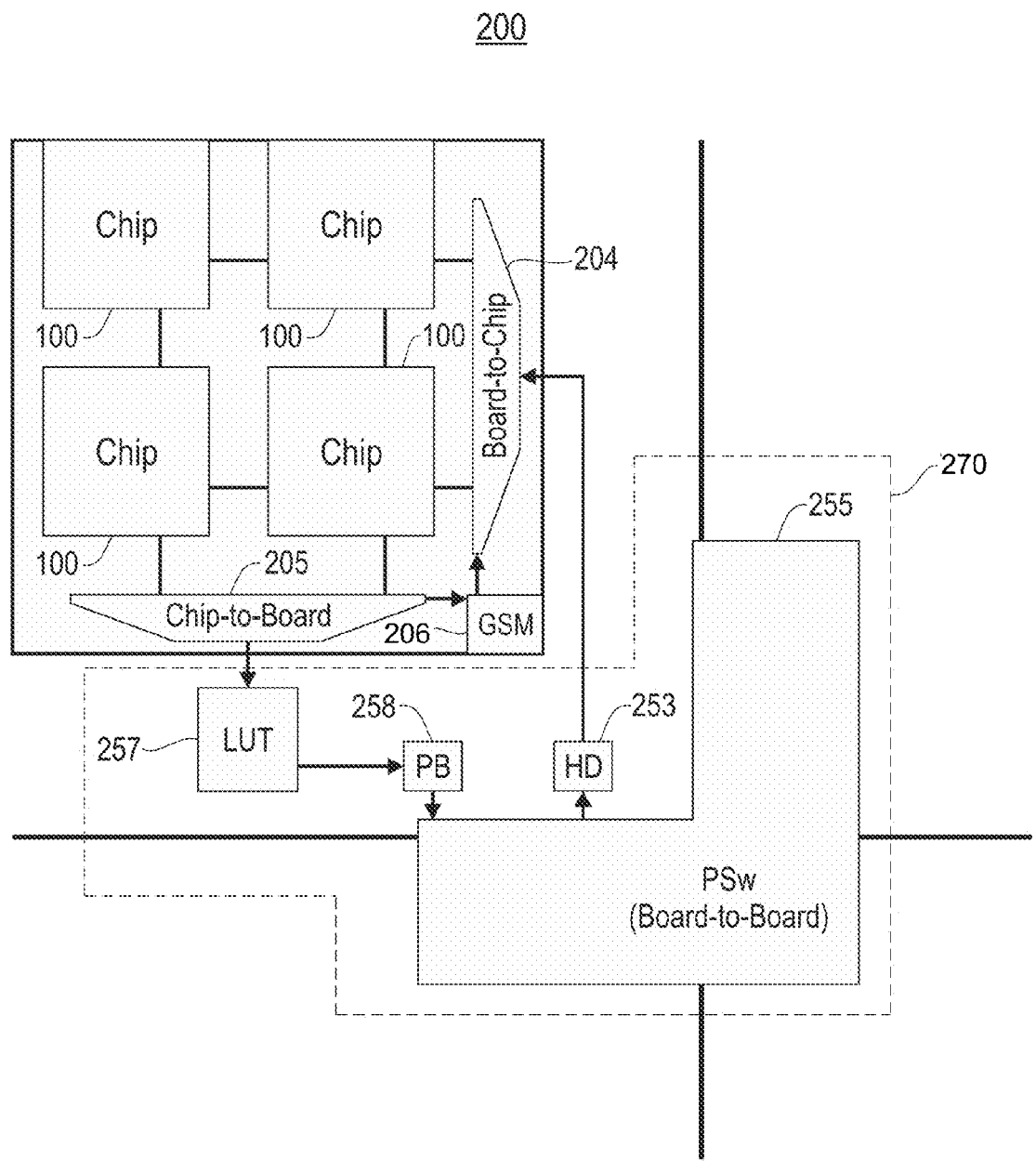
FIG. 4 illustrates a block diagram of a board structure, in accordance with an embodiment of the invention.

FIG. 4 illustrates a block diagram of a board structure 200, in accordance with an embodiment of the invention. In one example implementation, the board structure 200 comprises four chip structures 100 as shown in FIG. 4. The board structure 200 further comprises a board-to-chip address-event receiver (Board-to-Chip) 204, a chip-to-board address-event transmitter (Chip-to-Board) 205, and a controller 206 that functions as a global state machine (GSM). The board-to-chip address-event receiver 204 receives incoming address-event router packets and transmits them to the chip structures 100 containing target axons 15 (FIG. 1). The chip-to-board address-event transmitter 205 transmits outgoing address-event router packets generated by the chip structures 100. The controller 206 sequences event activity within a time-step, dividing each time-step into operational phases in the board structure 100 for chip structure 100 updates, etc.

According to an embodiment of the invention, all chip structures 100 within a board structure 200 share a single router 270 comprising a board-to-board lookup table (LUT) module 257, a board-to-board packet builder (PB) module 258, a board-to-board head delete (HD) module 253, and a board-to-board packet switch (PSw) 255. The board-to-board LUT 257 is configured to determine board structures 200 containing the target axons 15 (FIG. 1) for outgoing address-event router packets generated by the chip structures 100. The board-to-board PB 258 packetizes the routing information retrieved by the board-to-board LUT 257 into the outgoing address-event router packets. The board-to-board PSw 255 directs the outgoing address-event router packets to the determined board structures 200. The board-to-board PSw 255 is also configured to receive incoming address-event router packets from other board structures 200. The board-to-board HD 253 removes some routing information (e.g. board structure routing information) from an incoming address-event router packet and delivers the remaining incoming address-event router packet to the board-to-chip address-event receiver 204.

Figure 5:
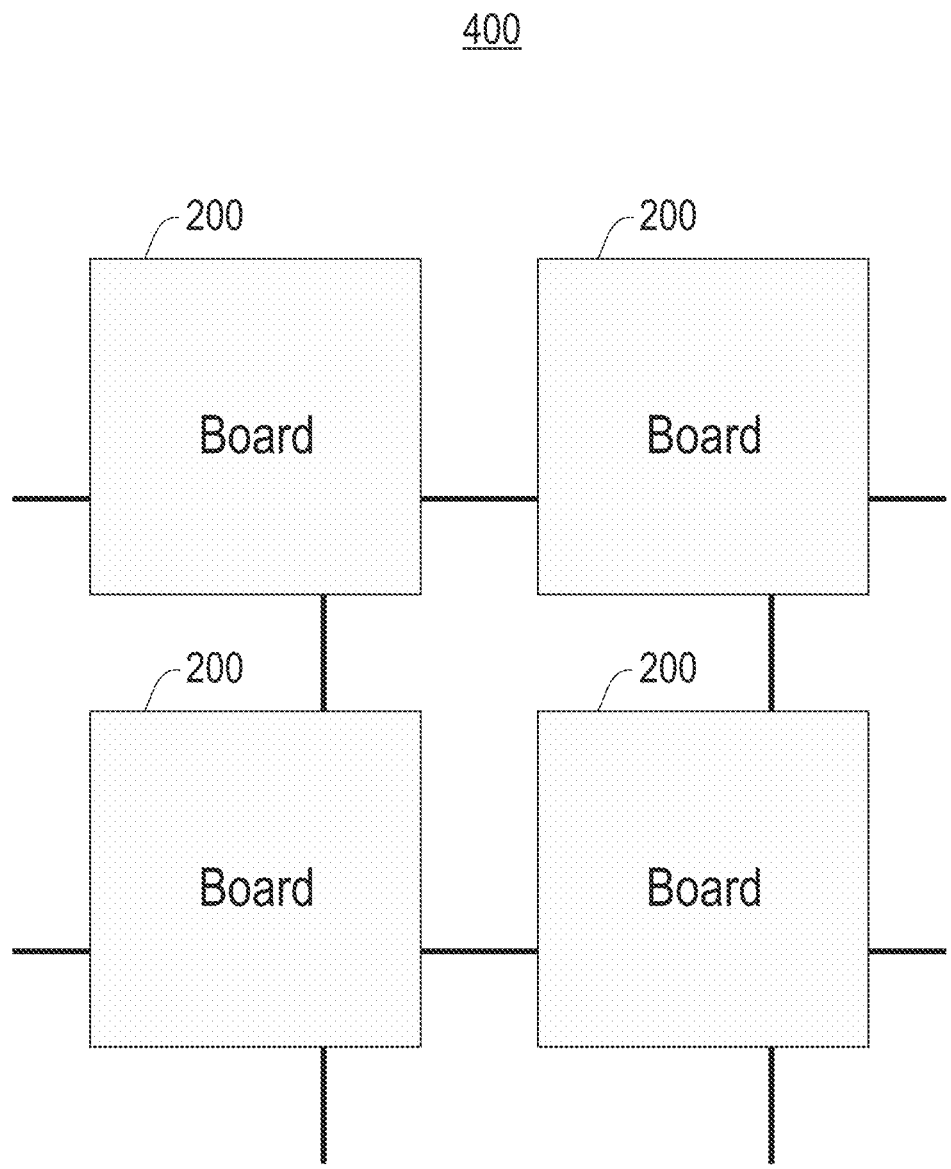
FIG. 5 illustrates an example neural network circuit including multiple interconnected board structures in a scalable low power network, in accordance with an embodiment of the invention.

FIG. 5 illustrates an example neural network circuit 400 including multiple interconnected board structures 200 in a scalable low power network, in accordance with an embodiment of the invention. The neural network circuit 400 is a scalable neuromorphic and synaptronic architecture. As discussed above, each board structure 200 comprises multiple chip structures 100 (FIG. 3), and each chip structure 100 in turn comprises multiple core modules 10 (FIG. 1). An event routing system of the neural network circuit 400 may include the router 70 of each core module 10, the router 170 of each chip structure 100, and the router 270 of each board structure 200.

Figure 6:
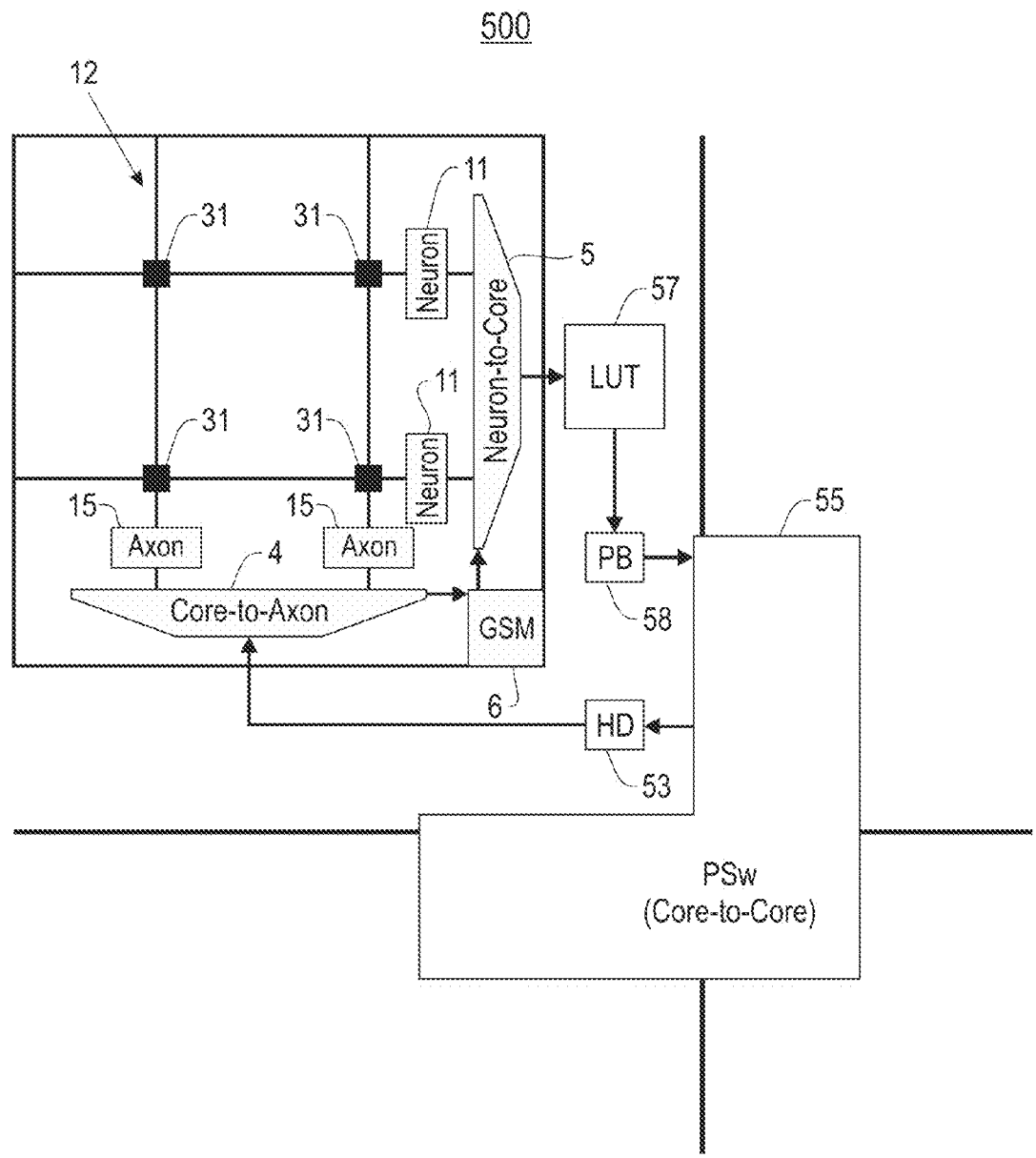
FIG. 6 illustrates a reflected core module, in accordance with an embodiment of the invention.

FIG. 6 illustrates a reflected core module 500, in accordance with an embodiment of the invention. The reflected core module 500 comprises the same components as a core module 10 (FIG. 1). Unlike the core module 10, however, the components in the reflected core module 500 are positioned such that they represent a reflection of the components in the core module 10. For instance, the axons 15 and the neurons 11 in the reflected core module 500 are positioned where the neurons 11 and the axons 15 in the core module 10, respectively, are positioned. Likewise, the address-events transmitter 5 and the address-events receiver 4 are positioned in the reflected core module 500 where the address-events receiver 4 and the address-events transmitter 5 in the core module 10, respectively, are positioned.

Figure 7:
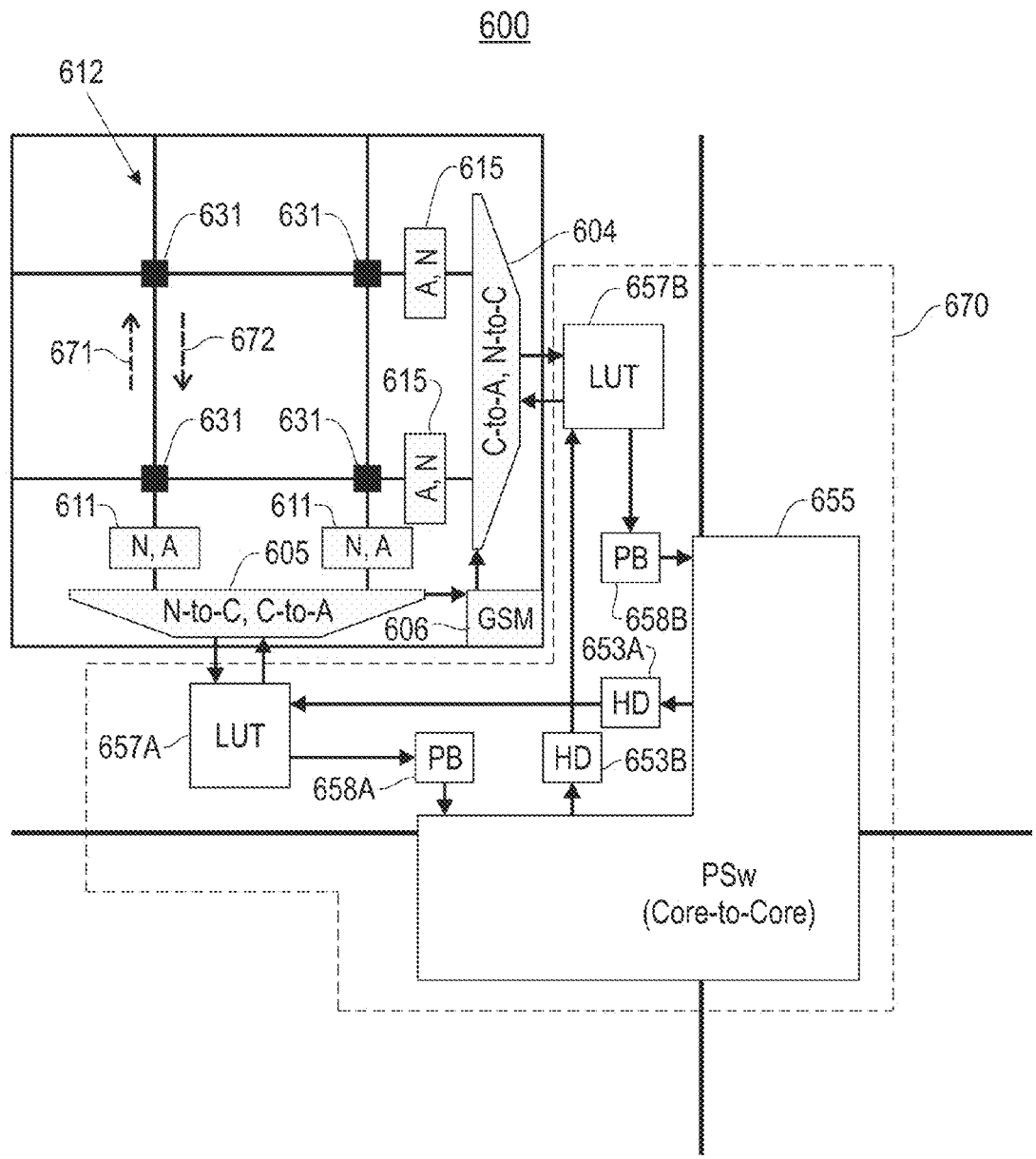
FIG. 7 illustrates a symmetric core circuit, in accordance with an embodiment of the invention.

FIG. 7 illustrates a symmetric core circuit 600, in accordance with an embodiment of the invention. The symmetric core circuit comprises a core module 10 (FIG. 1) and a reflected core module 500 (FIG. 6). The core modules 10 and 500 are logically overlaid on one another such that neurons 11 (FIG. 1) in the core module 10 are proximal to axons 15 (FIG. 6) in the reflected core module 500. This proximity results in neuron-axon sets 611. Similarly, axons 15 (FIG. 1) in the core module 10 are proximal to neurons 11 (FIG. 6) in the core module 500 such that axon-neuron pairs 615 are formed. This proximity results in axon-neuron sets 615.

The symmetric core circuit 600 further comprises an interconnection network 612 interconnecting the neuron-axon pairs 611 to the axon-neuron pairs 615. In one embodiment of the invention, the interconnection network 612 comprises an electronic synapse array comprising multiple electronic synapse devices ("synapses") 631. Each synapse 631 interconnects an axon 15 in an axon-neuron set 615 to a neuron 11 in a neuron-axon set 611, and also interconnects an axon 15 in a neuron-axon set 611 to a neuron 11 in an axon-neuron set 615. With respect to the synapse 631, the axon 15 and the neuron 11 represent an axon of a pre-synaptic neuron and a dendrite of a post-synaptic neuron, respectively.

In another embodiment of the invention, the interconnection network 612 comprises a first electronic synapse array corresponding to the core module 10, and a second electronic synapse array corresponding to the reflected core module 500. Each synapse array comprises multiple synapses 631. Each synapse 631 in the first electronic synapse array interconnects an axon 15 in an axon-neuron set 615 to a neuron 11 in a neuron-axon set 611. Each synapse 631 in the second electronic synapse array interconnects an axon 15 in a neuron-axon set 611 to a neuron 11 in an axon-neuron set 615. With respect to each synapse 631, the axon 15 and the neuron 11 represent an axon of a pre-synaptic neuron and a dendrite of a post-synaptic neuron, respectively.

Each neuron 11 in a neuron-axon set 611 or an axon-neuron set 615 receives firing events via interconnected axons and, in response to the firing events received, generates a firing event according to a neuronal activation function. The synapses 631 in the symmetric core circuit 600 have synaptic weights, the synaptic weights learned as a function of the firing events propagating through the interconnection network 612.

Information propagates through the interconnection network 612 in two directions (e.g. top-down, bottom-up). In one embodiment, the symmetric core circuit 600 may use time division multiple access (TDMA). In one phase of a time-step, a first set of axonal firing events propagates through the synapses 631 in a first direction represented by an arrow 671 in FIG. 7. In another phase of the same time-step, a second set of axonal firing events propagates through the synapses 631 in a second direction (i.e., a direction opposite to the first direction) represented by an arrow 672 in FIG. 7. The synaptic weights of the synapses 631 are learned as a function of the first set of axonal firing events and the second set of axonal firing events.

As shown in FIG. 7, the symmetric core circuit 600 further comprises a controller 606 that functions as a global state machine (GSM). The controller 606 sequences event activity within a time-step. The controller 606 divides each time-step into operational phases in the symmetric core circuit 600 for neuron updates, etc. As shown in FIG. 7, the symmetric core circuit 600 further a first address-event transmitter-receiver (Neuron-to-Chip (N-to-C), Chip-to-Axon (C-to-A)) 605 for the neuron-axon sets 611, and a second address-event transmitter-receiver (C-to-A, N-to-C) 604 for the axon-neuron sets 615. The address-event transmitter-receivers 605 and 604 transmit neuronal firing events generated by the neurons 11 in the neuron-axon sets 611 and the axon-neuron sets 615, respectively. The address-event transmitter-receivers 605 and 604 also receive firing events and transmit them to target axons in the neuron-axon sets 611 and the axon-neuron sets 615, respectively.

As shown in FIG. 7, the symmetric core circuit 600 further comprises a router 670. The router 670 is configured to selectively route neuronal firing events among symmetric core circuits 600. The router 670 comprises, for the neuron-axon sets 611, a first firing events address LUT module 657A, a first PB module 658A, and a first HD module 653A. The router 670 further comprises, for the axon-neuron sets 615, a second firing events address LUT module 657A, a second PB module 658A, and a second HD module 653A.

The LUTs 657A and 657B are configured to determine target axons for firing events generated by the neurons 11 in the neuron-axon sets 611 and the axon-neuron sets 615, respectively. The target axons may be axons 15 in the same symmetric core circuit 600 or other symmetric core circuits 600. Each LUT 657A, 657B retrieves information such as target distance, direction, addresses, and delivery times (e.g., about 19 bits/packet×4 packets/neuron). Each LUT 657A, 657B converts firing events generated by the neurons 11 into forwarding addresses of the target axons. The PBs 658A and 658B packetizes the routing information retrieved by the LUTs 657A and 657B, respectively, into outgoing address-event router packets.

Each LUT 657A, 657B is reconfigurable and comprises a sparse cross-bar 660 (FIG. 10) that is adaptive as a function of learning rules, such that each neuron 11 corresponding to said LUT is connected to only one output line. The LUTs 657A and 657B are also configured to receive firing events and transmit them to target axons in the neuron-axon sets 611 and the axon-neuron sets 615, respectively.

Also shown in FIG. 7, the router 670 further comprises a core-to-core packet switch (PSw) 655. The core-to-core PSw 655 directs the outgoing address-event router packets to the symmetric core circuits 600 containing the target axons. The core-to-core PSw 655 is also configured to receive incoming address-event router packets from other symmetric core circuits 600. The HDs 653A and 653B remove routing information from an incoming address-event router packet to deliver it as a time stamped firing event to the address-event transmitter-receivers 605 and 604, respectively.

Figure 8A:
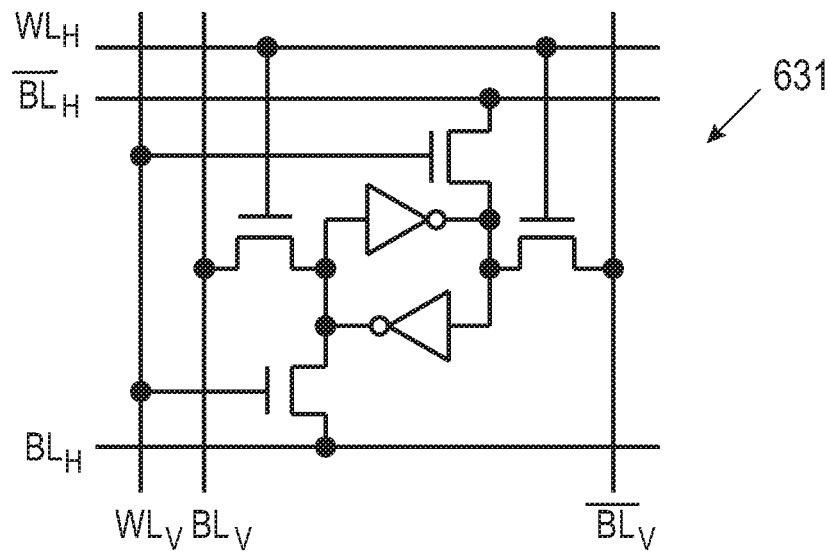
FIG. 8A illustrates a block diagram of a synapse, in accordance with an embodiment of the invention.

FIG. 8A illustrates a block diagram of a synapse 631, in accordance with an embodiment of the invention. Each synapse 631 comprises a static random access memory (SRAM) cell that permits reading and updating synaptic weights along the axons and the neurons. For example, a transposable cell is utilized for pre-synaptic (row) and post-synaptic (column) synapse updates. $WL_H$ stands for horizontal (axonal) wordlines and $BL_H$ stands for horizontal (axonal) bitlines as for memory arrays. $WL_V$ stands for vertical (neuronal) wordlines and $BL_V$ stands for vertical (neuronal) bitlines as for memory arrays. $WL_H$, $BL_H$, $\overline{BL}_H$ (inversion of $BL_H$) are used for axonal updates of the synapse 631, and $WL_V$, $BL_V$, $\overline{BL}_V$ are used for neuronal updates of the synapse 631.

Figure 8B:
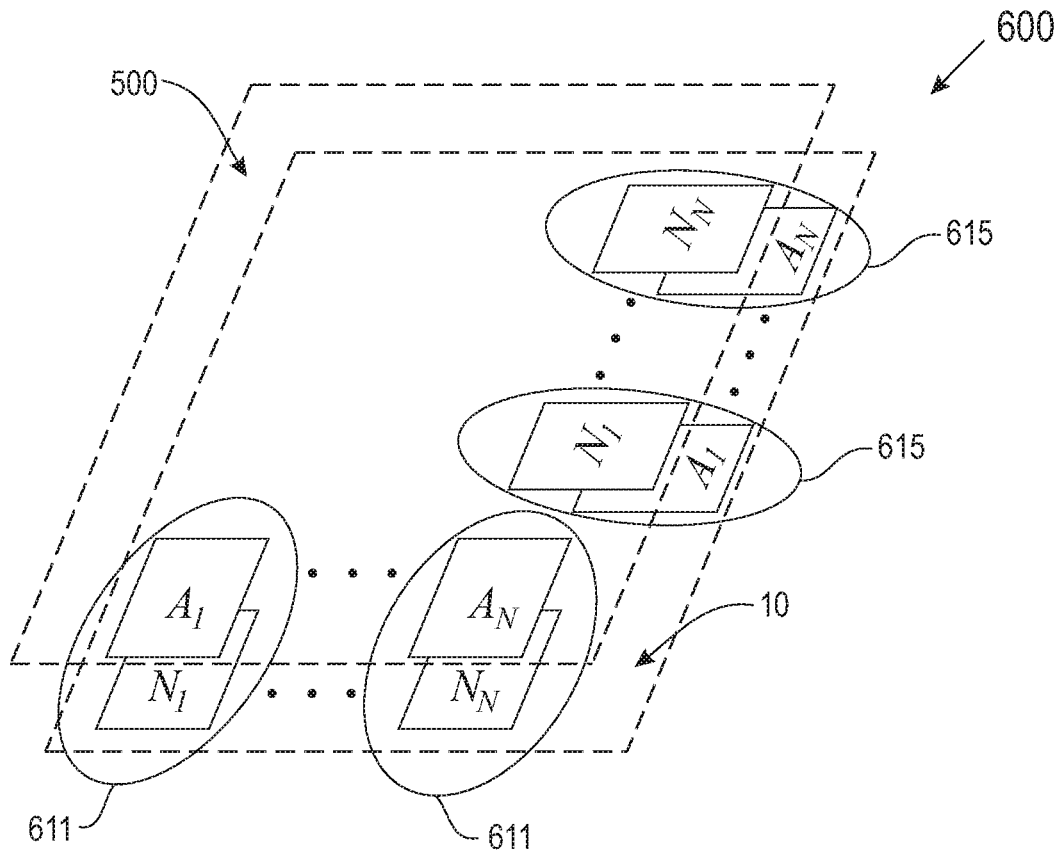
FIG. 8B illustrates a block diagram of a core modules and a reflected core module overlaid on one another in the symmetric core circuit, in accordance with an embodiment of the invention.

FIG. 8B illustrates a block diagram of the core modules 10 and 500 logically overlaid on one another in the symmetric core circuit 600, in accordance with an embodiment of the invention. As shown in this figure, each core module 10, 500 comprises neurons ($N_1, \ldots, N_n$) and axons ($A_1, \ldots, A_n$). Each neuron-axon set 611 includes a neuron in the core module 10 and an axon in the core module 500, wherein the neuron in the core module 10 is proximal to the axon in the core module 500. Each axon-neuron set 615 comprises an axon in the core module 10 and a neuron in the core module 500, wherein the axon in the core module 10 is proximal to the neuron in the core module 500. The proximity of a neuron and an axon of a neuron-axon set 611 or an axon-neuron set 615 enables the sharing of information about neuronal and axonal activations and the use of such information for learning.

Figure 9:
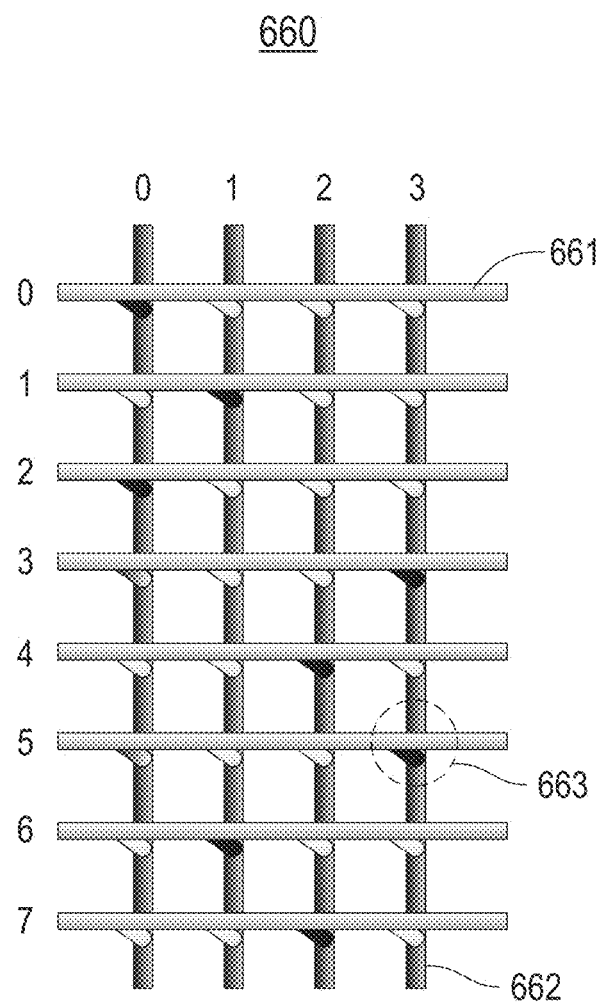
FIG. 9 illustrates a sparse cross-bar, in accordance with an embodiment of the invention.

FIG. 9 illustrates a sparse cross-bar 660, in accordance with an embodiment of the invention. As described above, each LUT 657A (FIG. 7), 657B (FIG. 7) comprises a sparse cross-bar 660. The sparse cross-bar 660 comprises multiple horizontal wires 661 and multiple vertical wires 662. Each horizontal wire 661 represents a neuron 11 (FIG. 1), each vertical wire represents a target axon 15 (FIG. 1). The sparse cross-bar 660 further comprises 1-value synapse at coordinates (0, 0), (1, 1), (2, 0), (3, 3), (4, 2), (5, 3), (6, 1), and (7, 2). Each synapse 663 interconnects a neuron 11 to a target axon 15. Specifically, a neuron 11 represented by horizontal wire 0 is connected to an axon 15 represented by vertical wire 0, a neuron 11 represented by horizontal wire 1 is connected to an axon 15 represented by vertical wire 1, and so forth. The sparse cross-bar 660 is adaptive as a function of learning rules, thus allowing for structural plasticity. In a preferred embodiment, each neuron 11 will connect to one and only one axon 15 via the cross-bar 660 and every axon 15 will receive connection from one and only one neuron 11.

Figure 10:
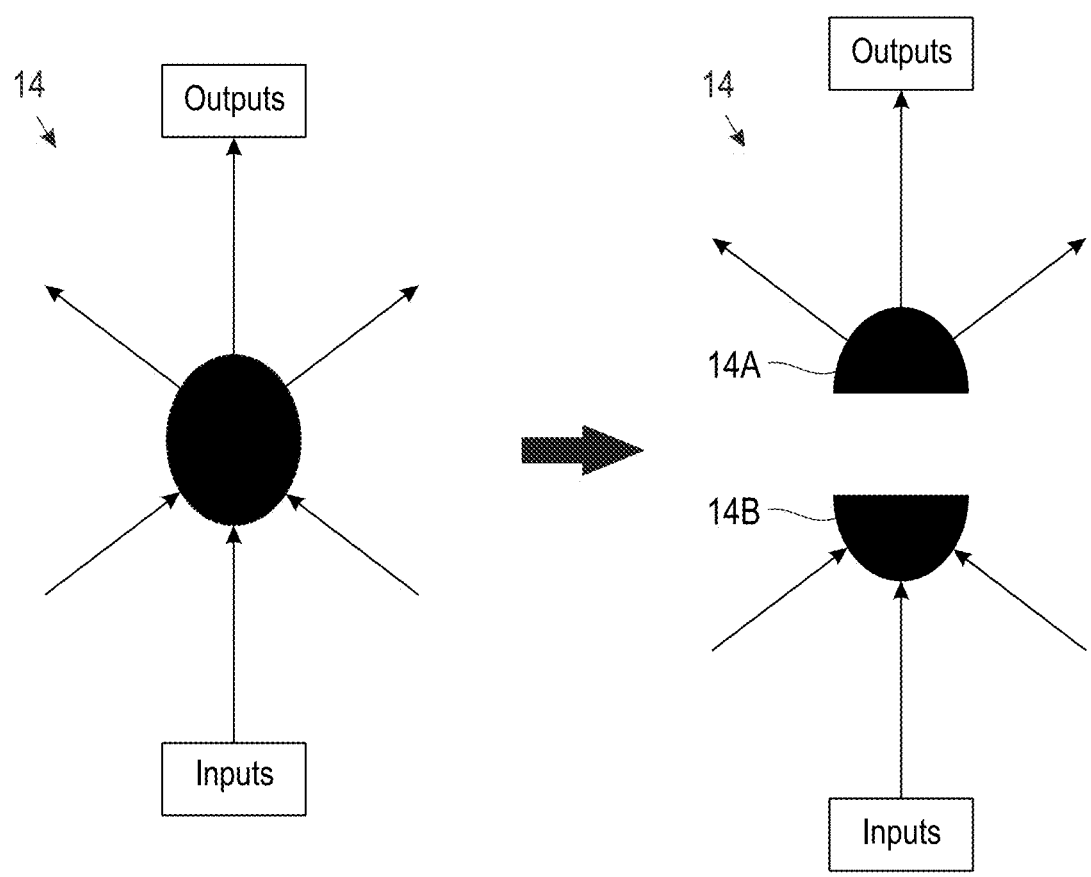
FIG. 10 illustrates an example neuron, in accordance with an embodiment of the invention.

FIG. 10 shows an example neuron 14, in accordance with an embodiment of the invention. The example neuron 14 has three inputs and three outputs. The neuron can be logically divided into an input part 14A and an output part 14B.

Figure 11:
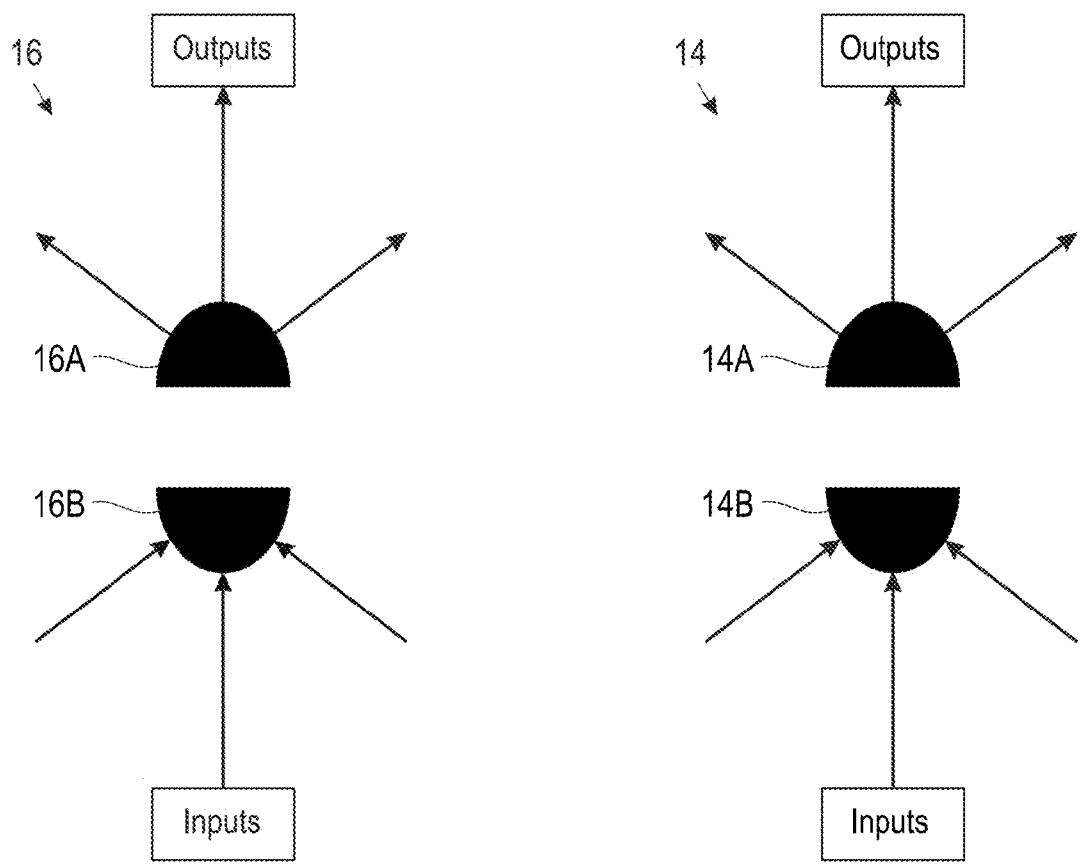
FIG. 11 illustrates two example neurons, in accordance with an embodiment of the invention.

FIG. 11 shows two example neurons 14 and 16, in accordance with an embodiment of the invention. The neuron 14 is logically divided into input parts 14A and 14B. Similarly, the neuron 16 is logically divided into input parts 16A and 16B.

Figure 12:
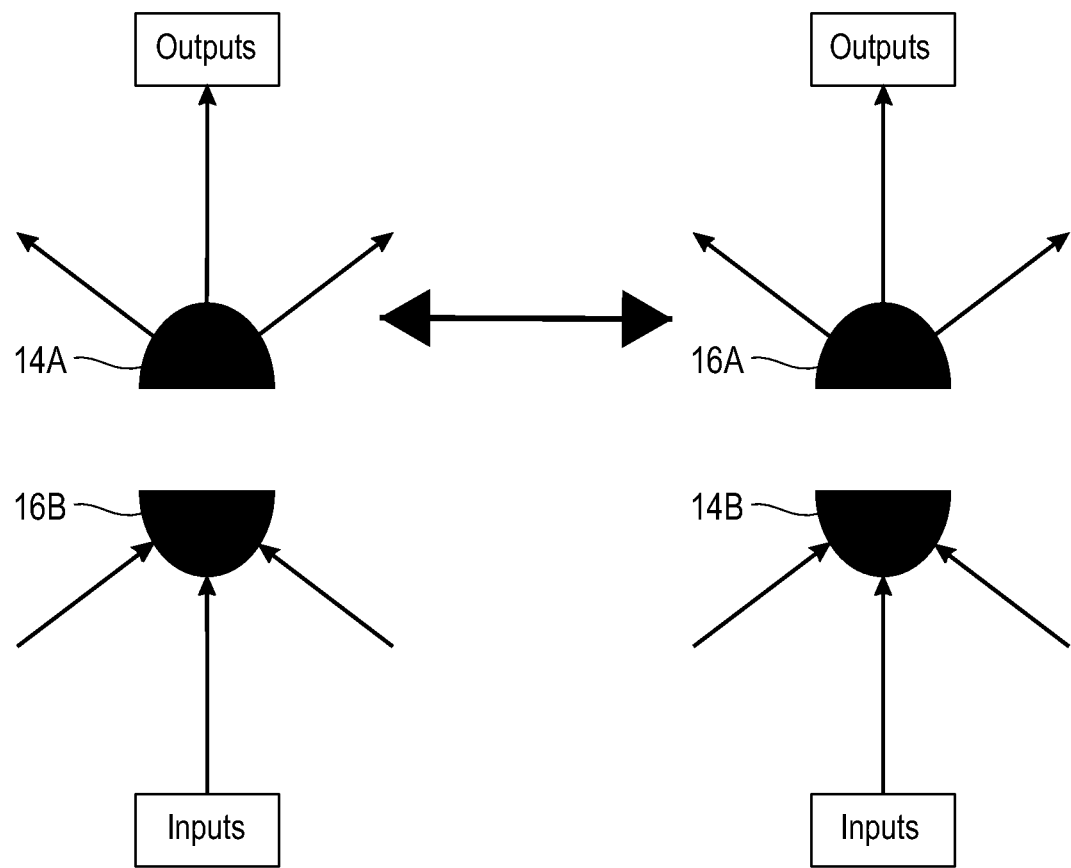
FIG. 12 illustrates the routing of information to the two example neurons in FIG. 12, in accordance with an embodiment of the invention.

FIG. 12 shows the neurons 14 and 16 in FIG. 11, in accordance with an embodiment of the invention. Each LUT 657A (FIG. 7), 657B (FIG. 7) may be programmed to allow the input part 16B of the neuron 16 to be routed to the output part 14A of the neuron. The input part 14B of the neuron 14 may also be routed to the output part 16A of the neuron 16. As such, though the two neurons 14 and 16 are not physically fully connected, the reprogrammable LUTs allow routing of messages between different inputs/outputs of the neurons at different times as needed to approximate a fully connected system while using very sparse projection and connectivity between the neurons.

In one embodiment, the hierarchical organization of the symmetric core circuits 600 comprises multiple chip structures 700 (FIG. 13), each chip structure 700 comprising a plurality of symmetric core circuits 600.

Figure 13:
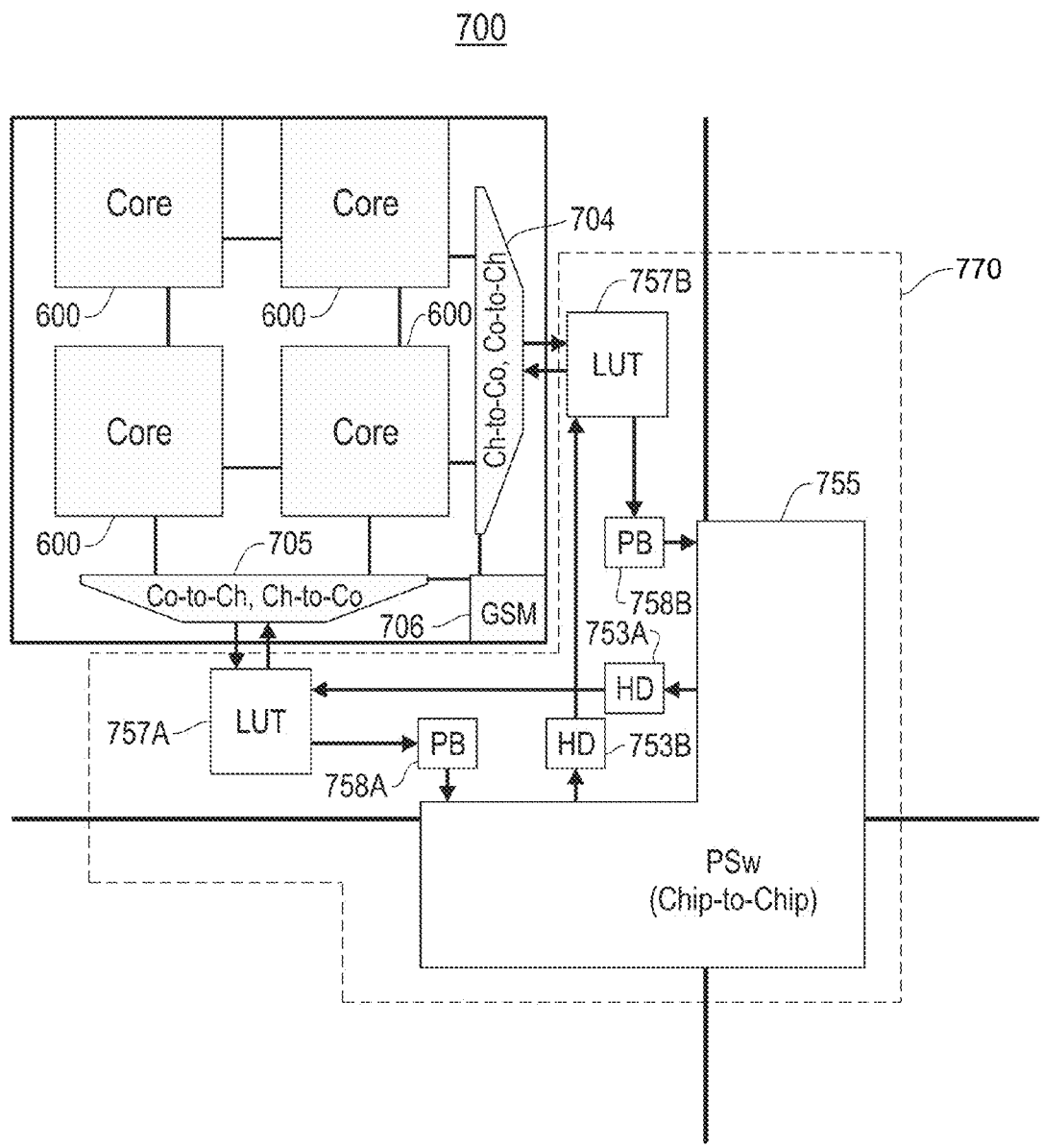
FIG. 13 illustrates a block diagram of a chip structure, in accordance with an embodiment of the invention.

FIG. 13 illustrates a block diagram of a chip structure 700, in accordance with an embodiment of the invention. In one example implementation, the chip structure 700 comprises four symmetric core circuits 600 as shown in FIG. 13. The chip structure 700 further comprises a first address-event transmitter-receiver (Core-to-Chip (Co-to-Ch), Chip-to-Core (Ch-to-Co)) 705, a second address-event transmitter-receiver (Ch-to-Co, Co-to-Ch) 704, and a controller 706 that functions as a global state machine (GSM). Each address-event transmitter-receiver 705, 704 receives incoming address-event router packets and transmits them to the symmetric core circuits 600 containing target axons. Each address-event transmitter-receiver 705, 704 also transmits outgoing address-event router packets generated by the symmetric core circuits 600. The controller 706 sequences event activity within a time-step, dividing each time-step into operational phases in the chip structure 700 for symmetric core circuit 600 updates, etc.

According to an embodiment of the invention, all symmetric core circuits 600 within a chip structure 700 share a single router 770 comprising a first chip-to-chip LUT module 757A, a second chip-to-chip LUT module 757B, a first chip-to-chip PB module 758A, a second chip-to-chip PB module 758B, a first chip-to-chip HD module 753A, a second chip-to-chip HD module 753B, and a chip-to-chip packet switch (PSw) 755. Each LUT 757A, 757B, each chip-to-chip PB 758A, 758B, each chip-to-chip HD 753A, 753B, and the chip-to-chip PSw 755 provide a hierarchical address-event multi-chip mesh router system, as a deadlock-free dimension-order routing (DR).

Each chip-to-chip LUT 757A, 757B is configured to determine chip structures 700 containing the target axons for outgoing address-event router packets generated by the symmetric core circuits 700. Each chip-to-chip LUT 757A, 757B is also configured to receive incoming address-event router packets.

The chip-to-chip PBs 758A and 758B packetizes the routing information retrieved by the chip-to-chip LUTs 757A and 757B into the outgoing address-event router packets, respectively. The chip-to-chip PSw 755 directs the outgoing address-event router packets to the determined chip structures 700. The chip-to-chip PSw 755 is also configured to receive incoming address-event router packets from other chip structures 700. The chip-to-chip HDs 753A and 753B removes some routing information (e.g. chip structure routing information) from an incoming address-event router packet and delivers the remaining incoming address-event router packet to the address-event transmitter-receivers 705 and 704, respectively.

In one embodiment, the hierarchical organization of the symmetric core circuits 600 comprises multiple board structures 800 (FIG. 14), each board structure 800 comprising a plurality of chip structures 700.

Figure 14:
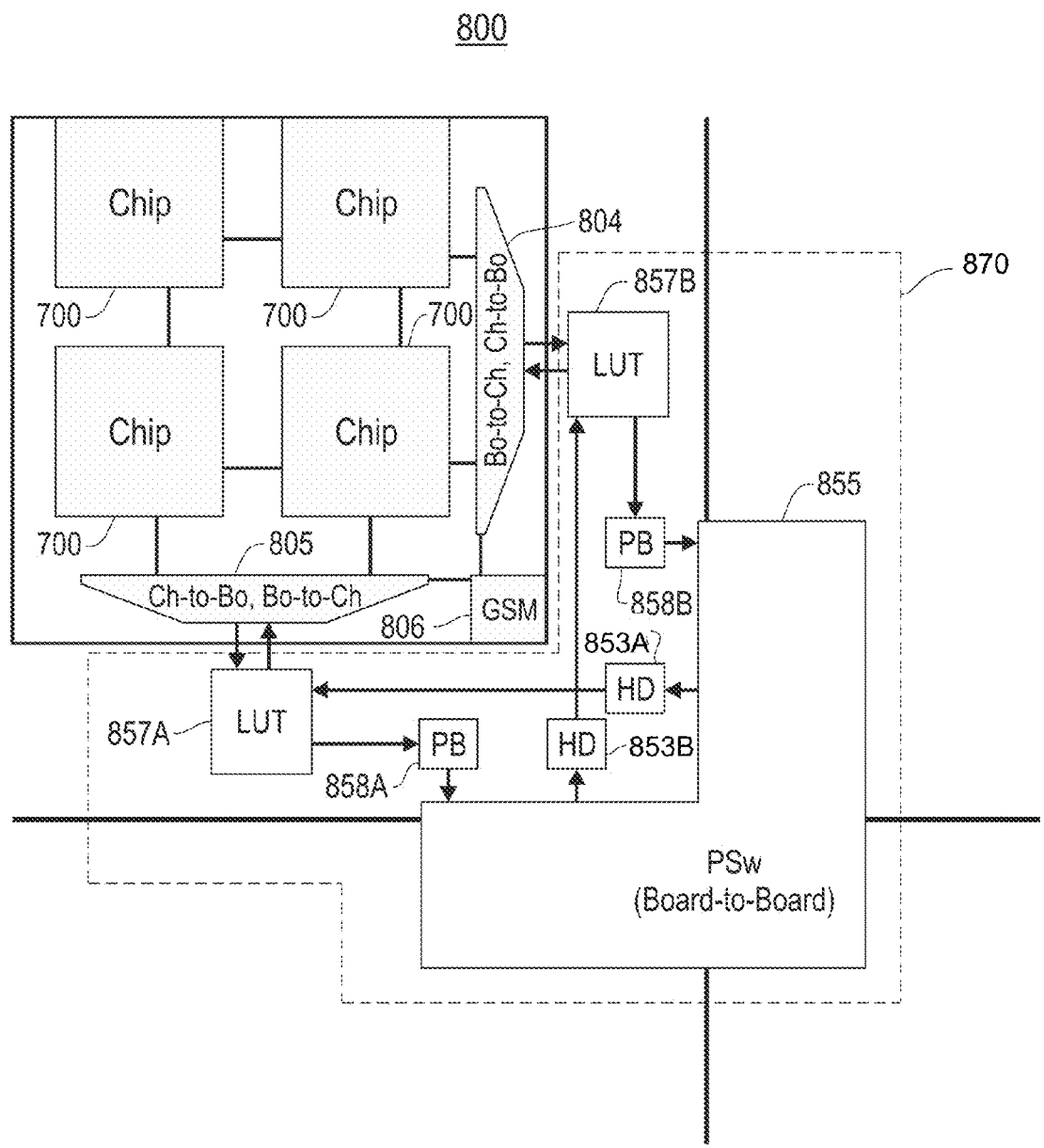
FIG. 14 illustrates a block diagram of a board structure, in accordance with an embodiment of the invention.

FIG. 14 illustrates a block diagram of a board structure 800, in accordance with an embodiment of the invention. In one example implementation, the board structure 800 comprises four chip structures 700 as shown in FIG. 13. The board structure 800 further comprises a first address-event transmitter-receiver (Chip-to-Board (Ch-to-Bo), Board-to-Chip (Bo-to-Ch)) 805, a second address-event transmitter-receiver (Bo-to-Ch, Ch-to-Bo) 804, and a controller 806 that functions as a global state machine (GSM). Each address-event transmitter-receiver 805, 804 receives incoming address-event router packets and transmits them to the chip structures 700 containing target axons. Each address-event transmitter-receiver 805, 804 also transmits outgoing address-event router packets generated by the chip structures 700. The controller 806 sequences event activity within a time-step, dividing each time-step into operational phases in the board structure 800 for chip structure 700 updates, etc.

According to an embodiment of the invention, all chip structures 700 within a board structure 800 share a single router 870 comprising a first board-to-board LUT module 857A, a second board-to-board LUT module 857B, a first board-to-board PB module 858A, a second board-to-board PB module 858B, a first board-to-board HD module 853A, a second board-to-board HD module 853B, and a board-to-board packet switch (PSw) 855.

Each board-to-board LUT 857A, 857B is configured to determine board structures 800 containing the target axons for outgoing address-event router packets generated by the chip structures 700. Each board-to-board LUT 857A, 857B is also configured to receive incoming address-event router packets.

The board-to-board PBs 858A and 858B packetizes the routing information retrieved by the board-to-board LUTs 857A and 857B into the outgoing address-event router packets, respectively. The board-to-board PSw 855 directs the outgoing address-event router packets to the determined board structures 800. The board-to-board PSw 855 is also configured to receive incoming address-event router packets from other board structures 800. The board-to-board HDs 853A and 853B removes some routing information (e.g. board structure routing information) from an incoming address-event router packet and delivers the remaining incoming address-event router packet to the address-event transmitter-receivers 805 and 804, respectively.

Figure 15:
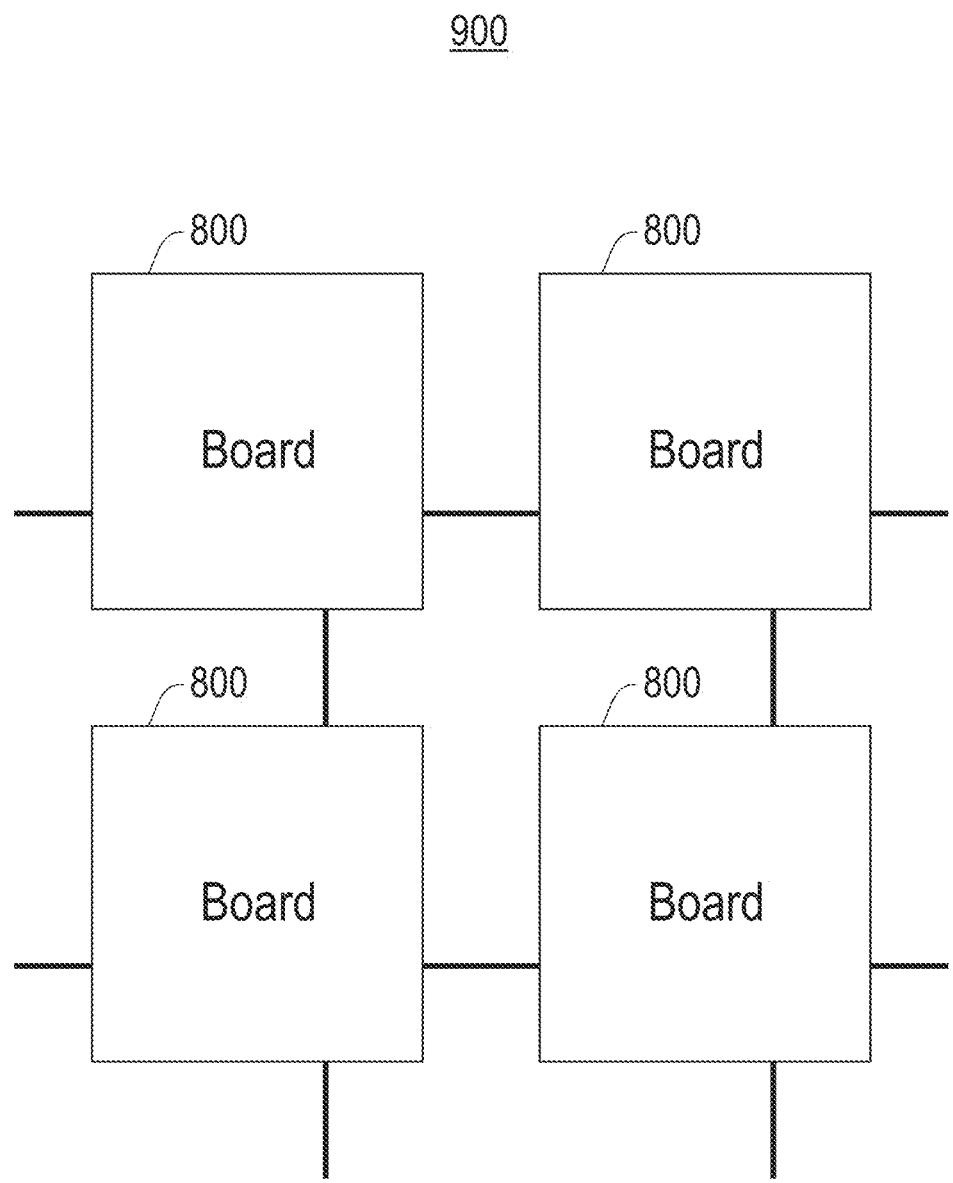
FIG. 15 illustrates an example neural network circuit including multiple interconnected board structures in a scalable low power network, in accordance with an embodiment of the invention.

FIG. 15 illustrates an example neural network circuit 900 including multiple interconnected board structures 800 in a scalable low power network, in accordance with an embodiment of the invention. The neural network circuit 900 is a scalable neuromorphic and synaptronic architecture.

As discussed above, each board structure 800 comprises multiple chip structures 700 (FIG. 13), and each chip structure 700 in turn comprises multiple symmetric core circuits 600 (FIG. 7). An event routing system of the neural network circuit 900 may include the router 670 (FIG. 7) of each symmetric core circuit 600, the router 770 (FIG. 13) of each chip structure 700, and the router 870 (FIG. 14) of each board structure 800.

Packets destined for other networks are routed to interchip routers (IR), using the same structure to set target chips/cores/axons. Interchip LUT information can be compact as it routes events from the same region, grouped into fascicles (bundles of axons) and receives identical routes (but different target axons). This allows parameterized chip compiler variants (number of cores, neurons and axons per core, STDP or NO-STDP, etc.) that can be generated on the fly.

Figure 16:
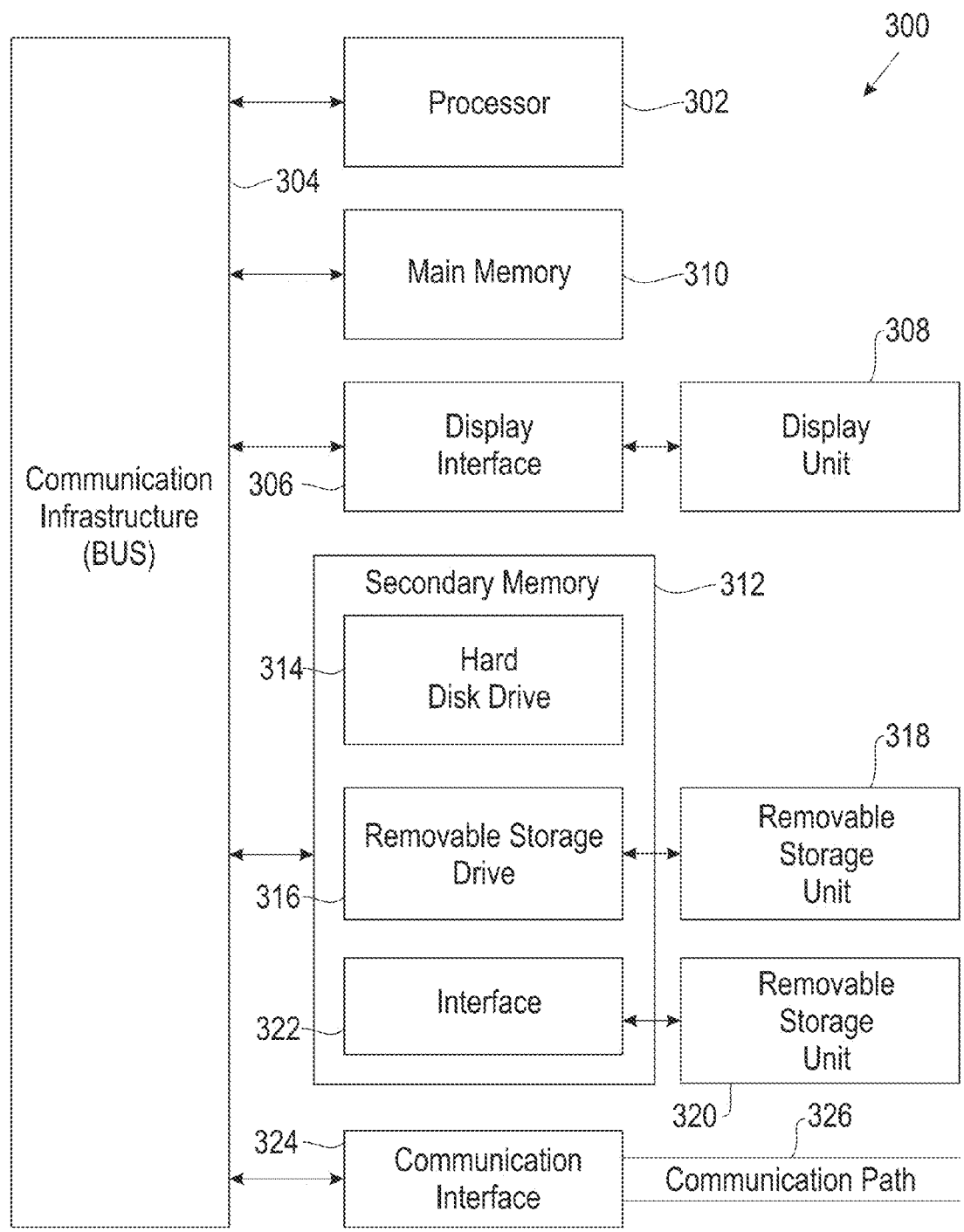
FIG. 16 is a high level block diagram showing an information processing system useful for implementing one embodiment of the present invention.

FIG. 16 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above- described exemplary embodiment that are currently known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
propagating a first set and a second set of axonal firing events through a symmetric core circuit in a first direction and a second direction, respectively, wherein the second direction is opposite of the first direction, the symmetric core circuit comprises a first core module and a second core module overlaid on one another and oriented differently relative to each other such that axonal firing events propagate through the first core module in the first direction and axonal firing events propagate through the second core module in the second direction, and each core module comprises an interconnection network for interconnecting multiple electronic neurons with multiple electronic axons;
for at least one neuron, receiving an axonal firing event via an interconnected axon; and
for at least one neuron, generating a neuronal firing event according to a neuronal activation function;
wherein each core module of the symmetric core circuit has a corresponding adaptive lookup table, the corresponding adaptive lookup table used to determine target axons for neuronal firing events generated by neurons in the core module; and
wherein a first neuron of the first core module is overlaid on and within proximity of a first axon of the second core module, thereby enabling the first neuron to share its neuronal activations with the first axon, and further enabling the first axon to share its axonal activations with the first neuron.

2. The method of claim 1, wherein:
neurons of the first core module are proximal to axons of the second core module, and axons of the first core module are proximal to neurons of the second core module.

3. The method of claim 2, wherein:
the interconnection network of each core module comprises multiple electronic synapses interconnecting the axons of the core module with the neurons of the core module; and
each synapse interconnects an axon to a neuron.

4. The method of claim 3, further comprising:
updating synaptic weights of the synapses as a function of:
the first set of axonal firing events propagating through the synapses in the symmetric core circuit in the first direction;
a first set of neuronal activations;
the second set of axonal firing events propagating through the synapses in the symmetric core circuit in the second direction; and
a second set of neuronal activations.

5. The method of claim 4, further comprising:
selectively routing neuronal firing events between multiple symmetric core circuits.

6. The method of claim 5, further comprising:
symmetrically routing the neuronal firing events
wherein for a source neuron of the first core module targeting a target axon of the first core module, a source neuron of the second core module that is proximal to the target axon of the first core module targets a target axon of the second core module that is proximal to the source neuron of the first core module.

7. The method of claim 6, further comprising:
for each adaptive lookup table, adapting the adaptive lookup table as a function of learning rules.

8. The method of claim 7, further comprising:
for each symmetric core circuit, directing neuronal firing events to target axons using a core-to-core packet switch.

9. The method of claim 8, further comprising:
selectively routing neuronal firing events between multiple symmetric core circuits based on a hierarchical organization of the symmetric core circuits;
wherein the hierarchical organization of the symmetric core circuits comprises:
multiple chip structures, wherein each chip structure comprises a plurality of symmetric core circuits; and
multiple board structures, wherein each board structure comprises a plurality of chip structures.

10. The method of claim 9, further comprising:
for each chip structure:
determining target chip structures containing target axons for neuronal firing events generated by neurons in the chip structure using a chip-to-chip lookup table; and
directing the neuronal firing events to the target chip structures containing the target axons using a chip-to-chip packet switch.

11. The method of claim 10, further comprising:
for each board structure:
determining target board structures containing target axons for neuronal firing events generated by neurons in the board structure using a board-to-board lookup table; and
directing the neuronal firing events to the target board structures containing the target axons using a board-to-board packet switch.

12. A system comprising a computer processor, a computer-readable hardware storage device, and program code embodied with the computer-readable hardware storage device for execution by the computer processor to implement a method comprising:

propagating a first set and a second set of axonal firing events through a symmetric core circuit in a first direction and a second direction, respectively, wherein the second direction is opposite of the first direction, the symmetric core circuit comprises a first core module and a second core module overlaid on one another and oriented differently relative to each other such that axonal firing events propagate through the first core module in the first direction and axonal firing events propagate through the second core module in the second direction, and each core module comprises an interconnection network for interconnecting multiple electronic neurons with multiple electronic axons;

for at least one neuron, receiving an axonal firing event via an interconnected axon; and for at least one neuron, generating a neuronal firing event according to a neuronal activation function;

wherein each core module of the symmetric core circuit has a corresponding adaptive lookup table, the corresponding adaptive lookup table used to determine target axons for neuronal firing events generated by neurons in the core module; and wherein a first neuron of the first core module is overlaid on and within proximity of a first axon of the second core module, thereby enabling the first neuron to share its neuronal activations with the first axon, and further enabling the first axon to share its axonal activations with the first neuron.

13. The system of claim 12, wherein:

neurons of the first core module are proximal to axons of the second core module, and axons of the first core module are proximal to neurons of the second core module.

14. The system of claim 13, wherein:

the interconnection network of each core module comprises multiple electronic synapses interconnecting the axons of the core module with the neurons of the core module; and each synapse interconnects an axon to a neuron.

15. The system of claim 14, the method further comprising:

updating synaptic weights of the synapses as a function of:
  the first set of axonal firing events propagating through the synapses in the symmetric core circuit in the first direction;
  a first set of neuronal activations;
  the second set of axonal firing events propagating through the synapses in the symmetric core circuit in the second direction; and
  a second set of neuronal activations.

16. The system of claim 15, the method further comprising:

selectively routing neuronal firing events between multiple symmetric core circuits.

17. The system of claim 16, the method further comprising:

symmetrically routing the neuronal firing events wherein for a source neuron of the first core module targeting a target axon of the first core module, a source neuron of the second core module that is proximal to the target axon of the first core module targets a target axon of the second core module that is proximal to the source neuron of the first core module.

18. The system of claim 17, the method further comprising:

for each adaptive lookup table, adapting the adaptive lookup table as a function of learning rules.

19. The system of claim 18, the method further comprising:

for each symmetric core circuit, directing neuronal firing events to target axons using a core-to-core packet switch.

20. A computer program product comprising a computer-readable hardware storage device having program code embodied therewith, the program code being executable by a computer to implement a method comprising:

propagating a first set and a second set of axonal firing events through a symmetric core circuit in a first direction and a second direction, respectively, wherein the second direction is opposite of the first direction, the symmetric core circuit comprises a first core module and a second core module overlaid on one another and oriented differently relative to each other such that axonal firing events propagate through the first core module in the first direction and axonal firing events propagate through the second core module in the second direction, and each core module comprises an interconnection network for interconnecting multiple electronic neurons with multiple electronic axons;

for at least one neuron, receiving an axonal firing event via an interconnected axon; and for at least one neuron, generating a neuronal firing event according to a neuronal activation function;

wherein each core module of the symmetric core circuit has a corresponding adaptive lookup table, the corresponding adaptive lookup table used to determine target axons for neuronal firing events generated by neurons in the core module; and wherein a first neuron of the first core module is overlaid on and within proximity of a first axon of the second core module, thereby enabling the first neuron to share its neuronal activations with the first axon, and further enabling the first axon to share its axonal activations with the first neuron.

* * * * *